US008095738B2

(12) United States Patent
Benhase et al.

(10) Patent No.: US 8,095,738 B2
(45) Date of Patent: Jan. 10, 2012

(54) DIFFERENTIAL CACHING MECHANISM BASED ON MEDIA I/O SPEED

(75) Inventors: Michael Thomas Benhase, Tucson, AZ (US); Lawrence Yiumchee Chiu, Saratoga, CA (US); Lokesh Mohan Gupta, Tucson, AZ (US); Yu-Cheng Hsu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 12/484,963

(22) Filed: Jun. 15, 2009

(65) Prior Publication Data

US 2010/0318744 A1 Dec. 16, 2010

(51) Int. Cl.
*G06F 12/00* (2006.01)
(52) U.S. Cl. .................... 711/134; 711/159
(58) Field of Classification Search .................. None
See application file for complete search history.

(56) References Cited

U.S. PATENT DOCUMENTS

| | | | |
|---|---|---|---|
| 5,394,531 A | | 2/1995 | Smith |
| 5,596,754 A | * | 1/1997 | Lomet ........................... 710/200 |
| 5,608,890 A | | 3/1997 | Berger et al. |
| 5,717,893 A | | 2/1998 | Mattson |
| 5,937,431 A | * | 8/1999 | Kong et al. ................... 711/145 |
| 2003/0033486 A1 | | 2/2003 | Mizrachi et al. |
| 2003/0079087 A1 | | 4/2003 | Kuwata |
| 2006/0143400 A1 | | 6/2006 | Steely, Jr. |
| 2008/0140940 A1 | | 6/2008 | Gill et al. |

FOREIGN PATENT DOCUMENTS

EP 0104588 A2 4/1984

OTHER PUBLICATIONS

Basu et al., "Scavenger: A New Last Level Cache Architecture with Global Block Priority", © 2007 IEEE, p. 421-432.*
Brian C. Forney, Andrea C. Arpaci-Dusseau, Remzi H. Arpaci-Dusseau; "Storage-Aware Caching: Revisiting Caching for Heterogeneous Storage Systems"; First USENIX Symposium on File and Storage Technologies (FAST '02) year 2002.
Songqing Chen; Haining Wang; Xiaodong Zhang; B. Shen; S. Wee; "Segment-based proxy caching for Internet streaming media delivery"; Multimedia, IEEE; vol. 12, Issue 3, Jul.-Sep. 2005 pp. 59-67.
Jiwu Shu; Yang Wang; Wei Xue; Yifeng Luo; "An Efficient SAN-Level Caching Method Based on Chunk-Aging"; Networking, Architecture, and Storage, 2007. NAS 2007. International Conference on Jul. 29-31, 2007 pp. 177-184.

* cited by examiner

*Primary Examiner* — Brian Peugh
(74) *Attorney, Agent, or Firm* — Nelson and Nelson; Daniel P. Nelson; Alexis V. Nelson (57) ABSTRACT

A method for allocating space in a cache based on media I/O speed is disclosed herein. In certain embodiments, such a method may include storing, in a read cache, cache entries associated with faster-responding storage devices and cache entries associated with slower-responding storage devices. The method may further include implementing an eviction policy in the read cache. This eviction policy may include demoting, from the read cache, the cache entries of faster-responding storage devices faster than the cache entries of slower-responding storage devices, all other variables being equal. In certain embodiments, the eviction policy may further include demoting, from the read cache, cache entries having a lower read-hit ratio faster than cache entries having a higher read-hit ratio, all other variables being equal. A corresponding computer program product and apparatus are also disclosed and claimed herein.

24 Claims, 7 Drawing Sheets

DIFFERENTIAL CACHING MECHANISM BASED ON MEDIA I/O SPEED

BACKGROUND

1. Field of the Invention

This invention relates to caching algorithms, and more particularly to apparatus and methods for increasing the efficiency of a cache.

2. Background of the Invention

In the field of computing, cache algorithms (also referred to as replacement algorithms or replacement policies) are algorithms that a computer program or hardware uses to manage information stored in its cache. When the cache is full, the computer uses the algorithm to determine which items to discard in order to make space for new items. The "hit rate" of the cache describes how often a searched-for item is actually found in the cache. The "latency" of the cache describes how long after requesting a desired item the cache can return the item (assuming a hit occurs). More efficient replacement policies generally keep better track of usage information in an effort to improve cache hit rates. Faster replacement strategies generally disregard usage information to reduce the amount of time required to update the information. In general, a replacement strategy is typically a compromise between hit rate and latency.

In some cases, storage controllers or other computing devices may control storage devices with I/O rates that differ significantly. For example, a storage controller may control both solid-state drives (SSDs) and hard-disk drives (HDDs). Because the I/O speed does not depend on the physical location of data within an SSD, the read performance of SSDs is typically far higher than the read performance of HDDs. Unfortunately, modern cache algorithms do not distinguish between data originating from faster storage devices and data originating from slower storage devices. This can cause data from faster storage devices to fill up the cache (since a host can drive I/O to a faster-responding storage device much faster) and leave little room for data from slower storage devices. This can also reduce the read-hit ratio for the slower storage device. This is an inefficient way to allocate space in the cache, since data from faster storage devices can be fetched much faster than data from slower storage devices.

In view of the foregoing, what are needed are apparatus and methods to more efficiently allocate cache to increase the hit rates of slower-responding storage devices. More specifically, apparatus and methods are needed to efficiently allocate space in a cache based on media I/O speed. Further needed are apparatus and methods to prevent data from faster-responding storage devices from dominating the cache to the detriment of slower-responding storage devices.

SUMMARY

The invention has been developed in response to the present state of the art and, in particular, in response to the problems and needs in the art that have not yet been fully solved by currently available caching apparatus and methods. Accordingly, the invention has been developed to provide apparatus and methods for allocating space in a cache based on media I/O speed. The features and advantages of the invention will become more fully apparent from the following description and appended claims, or may be learned by practice of the invention as set forth hereinafter.

Consistent with the foregoing, a method for allocating space in a cache based on media I/O speed is disclosed herein. In certain embodiments, such a method may include storing, in a read cache, cache entries associated with faster-responding storage devices and cache entries associated with slower-responding storage devices. The method may further include implementing an eviction policy in the read cache. This eviction policy may include demoting, from the read cache, the cache entries of faster-responding storage devices faster than the cache entries of slower-responding storage devices, all other variables being equal. In certain embodiments, the eviction policy may further include demoting, from the read cache, cache entries having a lower read-hit ratio faster than cache entries having a higher read-hit ratio, all other variables being equal.

A corresponding computer program product and apparatus are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, these embodiments will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may generally be referred to herein as "modules" or a "system." Furthermore, the present invention may take the form of a computer program product embodied in any tangible medium of expression having computer-usable program code stored therein.

Any combination of one or more computer-usable or computer-readable medium(s) may be utilized to store the computer program product. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
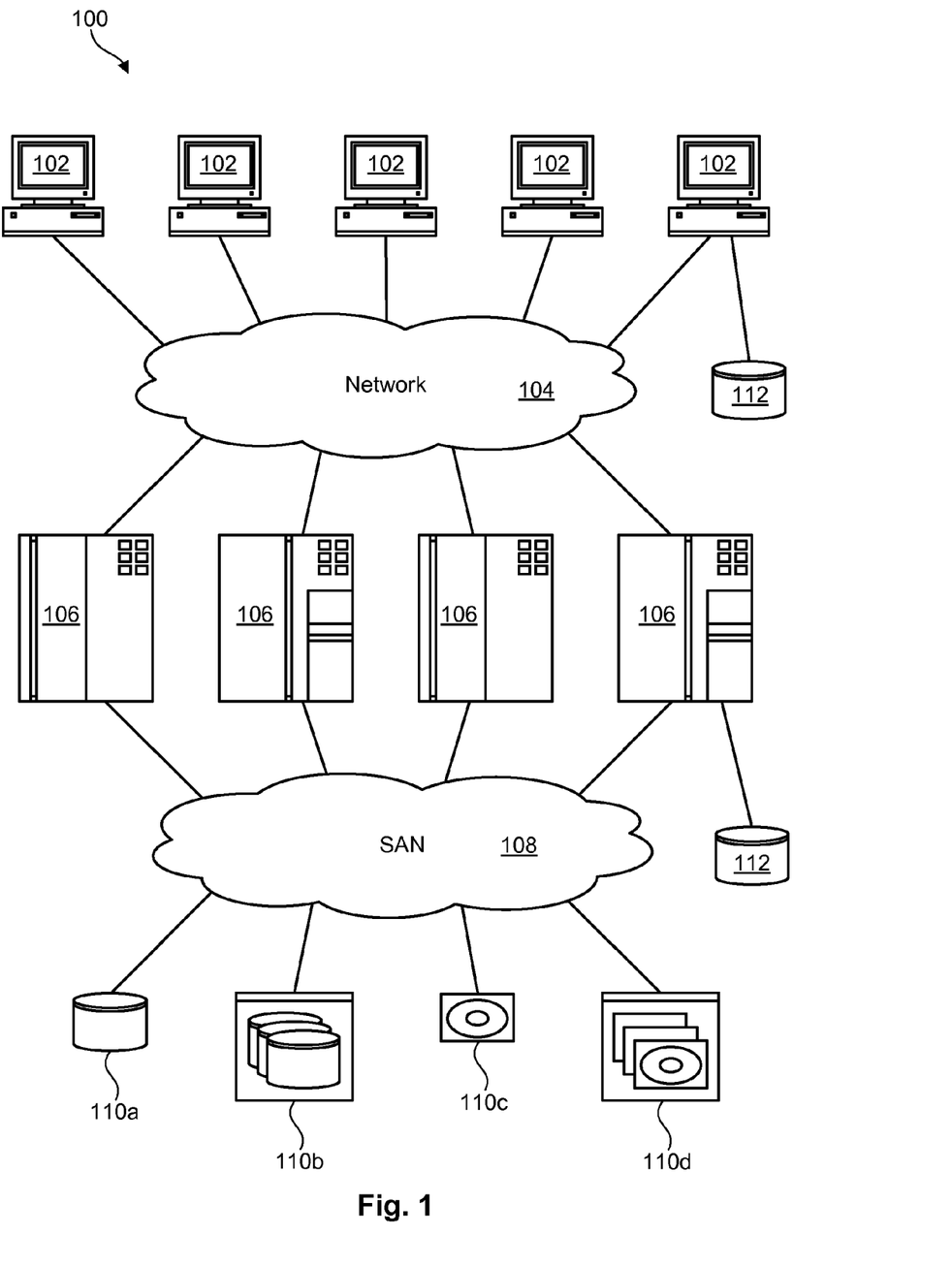
FIG. 1 is a high-level block diagram showing one example of a computer network architecture and computing hardware for implementing an apparatus and method in accordance with the invention.

Referring to FIG. 1, one embodiment of computer-network architecture 100 is illustrated. The architecture 100 is presented to show various scenarios for implementing a caching apparatus and method in accordance with the invention. The architecture 100 is presented only by way of example and is not intended to be limiting. Indeed, the caching apparatus and methods disclosed herein may be applicable to a wide variety of different computers, servers, storage systems, and network architectures, in addition to the network architecture 100 shown.

As shown, the computer-network architecture 100 may include one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106. In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., hard disk drives, solid-state drives, tape drives, etc). These computers 102, 106 and direct-attached storage devices 112 may communicate using protocols such as ATA, SATA, SCSI, SAS, Fibre Channel, or the like. Any or all of the computers 102, 106 may include a cache to store data retrieved from the storage devices 112.

The computer-network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as individual hard disk drives 110a or solid state drives 110a, arrays 110b of hard disk drives or solid-state drives, tape drives 110c, tape libraries 110d, CD-ROM libraries, or the like. Where the network 108 is a SAN, the servers 106 and storage systems 110 may communicate using a networking standard such as Fibre Channel (FC).

Figure 2:
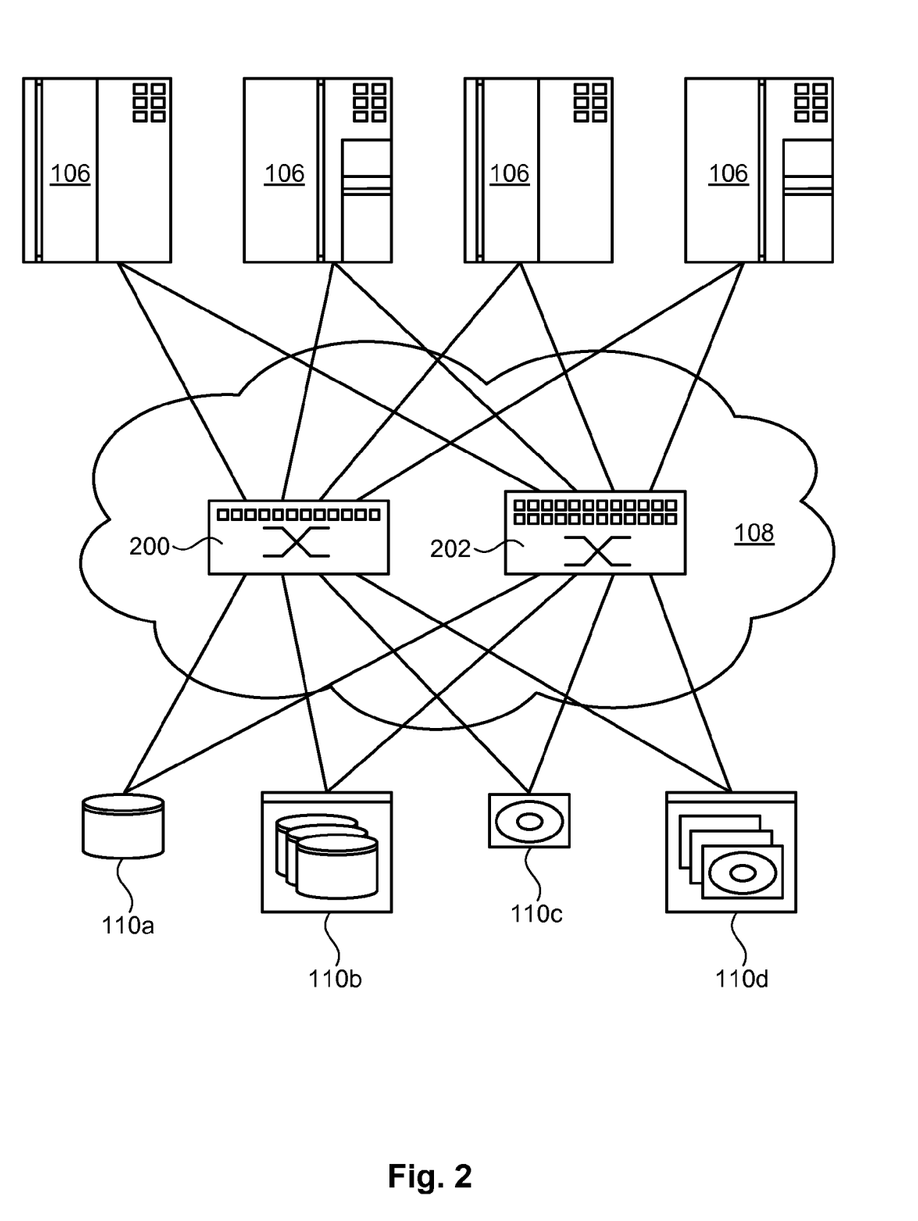
FIG. 2 is a high-level block diagram showing one example of a storage-area-network where an apparatus and method in accordance with the invention may be implemented.

Referring to FIG. 2, in selected embodiments, the storage network 108 may provide connectivity between the servers 106 and storage systems 110 using one or more interconnect components, such as switches, directors, hubs, gateways, bridges, routers, or the like. These interconnect components may create a fabric between the servers 106 and the storage systems 110. As shown in FIG. 2, a switch 200 and a director 202 may be used to provide a switched fabric 108 between the servers 106 and the storage systems 110. Any or all of the interconnect components may, in certain embodiments, include a cache to store data retrieved from the storage systems 110.

Figure 3:
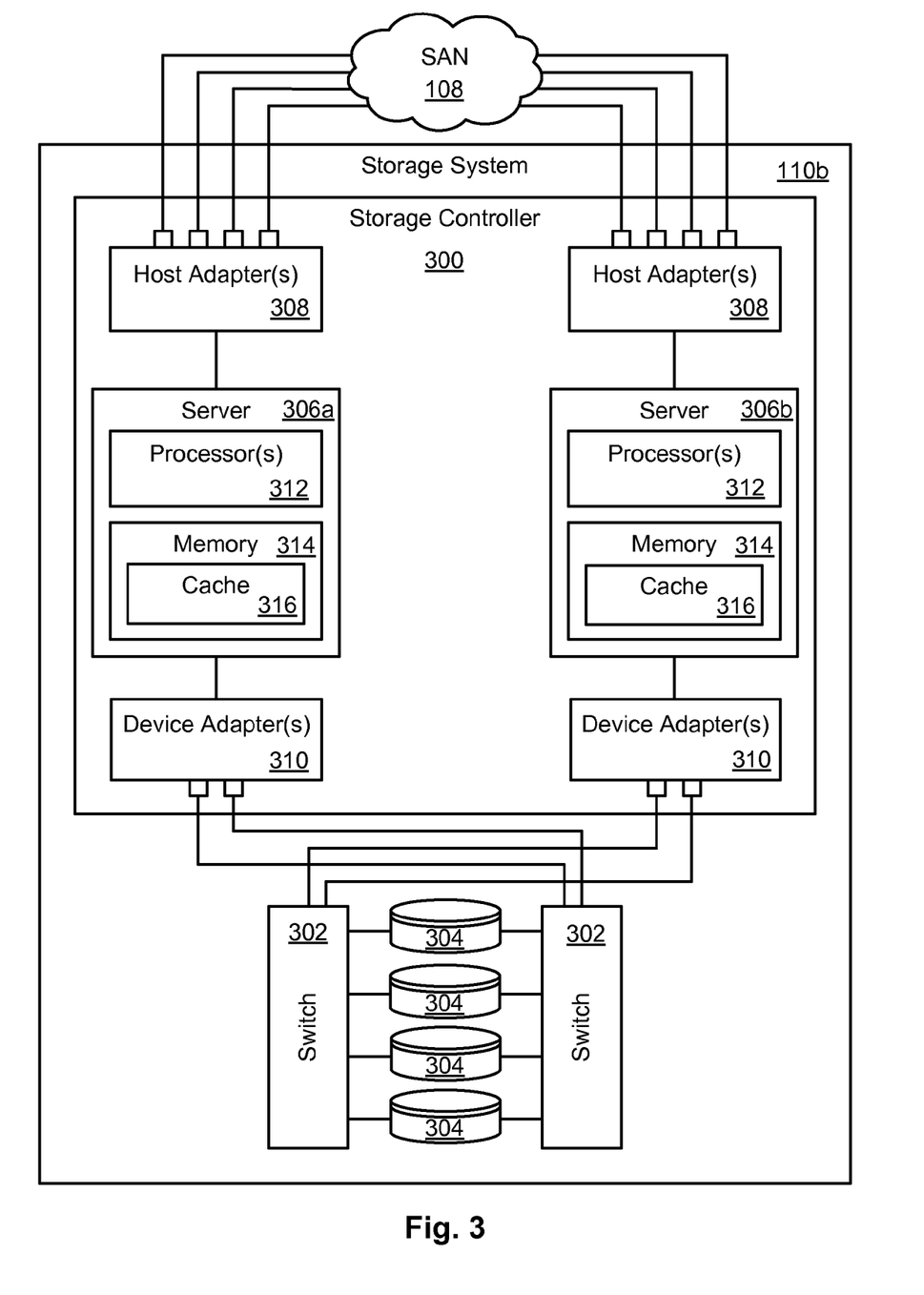
FIG. 3 is a high-level block diagram showing one example of a storage system where an apparatus and method in accordance with the invention may be implemented.

FIG. 3 shows one embodiment of a storage system 110b containing an array of hard-disk drives and/or solid-state drives. The internal components of the storage system 110b are shown since the caching techniques may, in certain embodiments, be implemented within such a storage system 110b, although they may also be applicable to other storage systems 110. As shown, the storage system 110b includes a storage controller 300, one or more switches 302, and one or more storage devices 304, such as hard disk drives 304 or solid-state drives 304. The storage controller 300 may enable one or more hosts (e.g., open system and/or mainframe servers 106) to access data in one or more storage devices 304.

In selected embodiments, the storage controller 300 includes one or more servers 306. The storage controller 300 may also include host adapters 308 and device adapters 310 to connect to host devices and storage devices 304, respectively. Multiple servers 306a, 306b may provide redundancy to ensure that data is always available to connected hosts. Thus, when one server 306a fails, the other server 306b may remain functional to ensure that I/O is able to continue between the hosts and the storage devices 304. This process may be referred to as a "failover."

One example of a storage controller 300 having an architecture similar to that illustrated in FIG. 3 is the IBM DS8000™ enterprise storage system. The DS8000™ is a high-performance, high-capacity storage controller providing disk storage that is designed to support continuous operations. The DS8000™ series models may use IBM's POWER5™ servers 306a, 306b, which may be integrated with IBM's virtualization engine technology. Nevertheless, the caching apparatus and methods disclosed herein are not limited to the IBM DS8000™ enterprise storage system 110b, but may be implemented in comparable or analogous storage systems 110, regardless of the manufacturer, product name, or components or component names associated with the system 110. Furthermore, any system that could benefit from one or more embodiments of the invention is deemed to fall within the scope of the invention. Thus, the IBM DS8000™ is presented only by way of example and is not intended to be limiting.

In selected embodiments, each server 306 may include one or more processors 312 (e.g., n-way symmetric multiprocessors) and memory 314. The memory 314 may include volatile memory (e.g., RAM) as well as non-volatile memory (e.g., ROM, EPROM, EEPROM, hard disks, flash memory, etc.). The volatile memory 314 and non-volatile memory 314 may, in certain embodiments, store software modules that run on the processor(s) 312 and are used to access data in the storage devices 304. The servers 306 may host at least one instance of these software modules. These software modules may manage all read and write requests to logical volumes in the storage devices 304.

In selected embodiments, the memory 314 may include a cache 316. Whenever a host (e.g., an open system or mainframe server 106) performs a read operation, the servers 306 may fetch data from the storages devices 304 and save it in the cache 316 in the event it is required again. If the data is requested again by a host 106, the server 306 may fetch the data from the cache 316 instead of fetching it from the storage devices 304, saving both time and resources.

As previously mentioned, in some cases, a storage controller 300 or other computing device may control or connect to storage devices with I/O rates that differ significantly. For example, the storage devices 304 in the storage system 110b may include both solid-state drives (SSDs) 304 and hard-disk drives (HDDs) 304. As previously explained, the read performance of SSDs is typically far higher than the read performance of HDDs. Unfortunately, modern cache algorithms do not distinguish between data originating from faster-responding storage devices and data originating from slower-responding storage devices. This can cause data from faster storage devices to fill up the cache and leave little room for data from slower storage devices. This can also reduce the read hit ratio for the slower storage devices.

Figure 4:
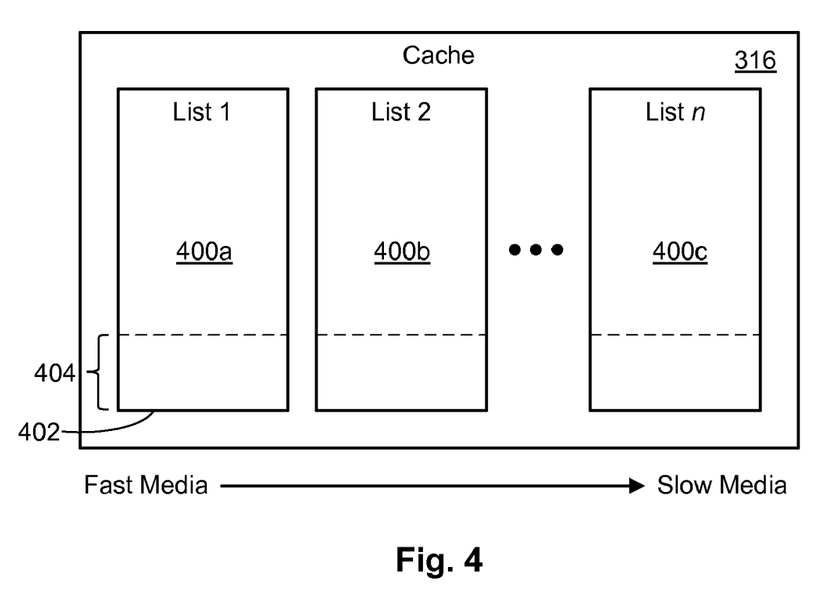
FIG. 4 is a high-level block diagram showing various lists that may be stored in cache.

Referring to FIG. 4, in certain embodiments, an improved caching method may include partitioning a cache 316 to create one or more lists 400a-c, with each list 400 storing cache entries associated with a different storage device. For the sake of illustration, the lists 400a-c are organized according to storage-media I/O speed, with lists 400 of faster-responding storage devices on the left and lists of slower-responding storage devices on the right. Each list 400 may include an LRU (least recently used) end 402, and a bottom portion 404 associated with the LRU end 402 that stores a selected number of LRU cache entries. It is assumed that each cache entry includes a timestamp or other information that can be used to determine its age. As will be explained in more detail hereafter, cache entries may be demoted from each of the lists 400a-c starting from the LRU end 402 of the lists 400a-c.

It should be recognized that the lists 400a-c represent logical partitions in the cache 316 and do not necessarily represent physical sections or partitions. Thus, in actual implementations, the lists 400a-c may be physically interspersed with one another on the storage media as opposed to being physically segregated, although this is not mandatory. Furthermore, the size of the lists 400a-c, and thus the size of the partitions, may change as old cache entries are demoted from the lists 400a-c to make room for new cache entries. That is, a new cache entry associated with a first storage device may use space formerly occupied by an old cache entry associated with a second storage device, thereby allowing the size of the lists 400a-b to change in a dynamic manner.

Figure 5:
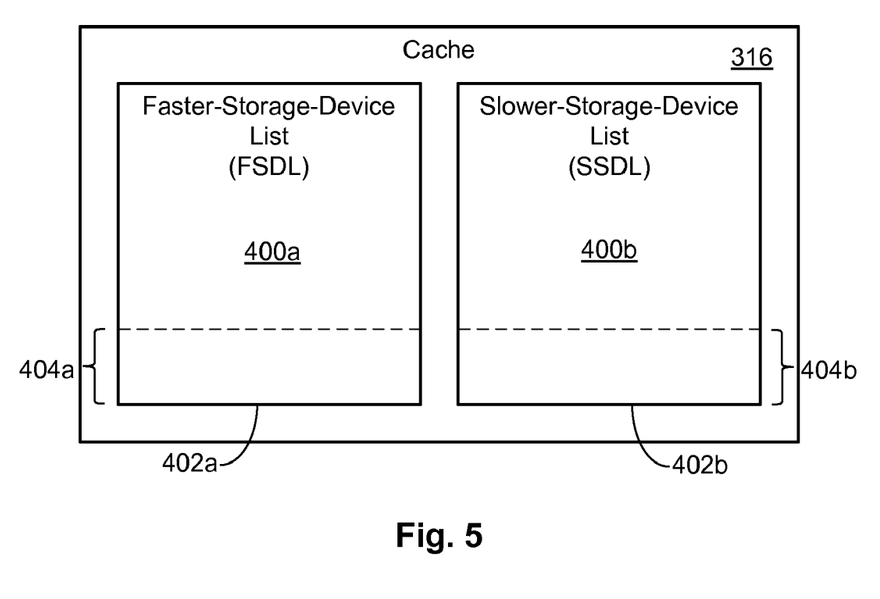
FIG. 5 is a high-level block diagram showing one example of lists that may be stored in cache, wherein one list is associated with a faster-responding storage device and the other list is associated with a slower-responding storage device.

Referring to FIG. 5, to explain the function of the improved caching method, a cache 316 storing lists 400a, 400b associated with two storage devices is illustrated—a list 400a associated with a faster-responding storage device (FSDL) and a list 400b associated with a slower-responding storage device (SSDL). Each list 400a, 400b includes an LRU end 402a, 402b and a bottom portion 404a, 404b associated with the LRU end 402a, 402b and storing the least recently used cache entries. This example will be used in the following description and Figures and it not intended to be limiting. Indeed, apparatus and methods in accordance with the invention may be easily scaled or modified to address situations using more than two storage devices having different I/O speeds. For the sake of simplicity, two lists 400a, 400b are used in this example.

Figure 6:
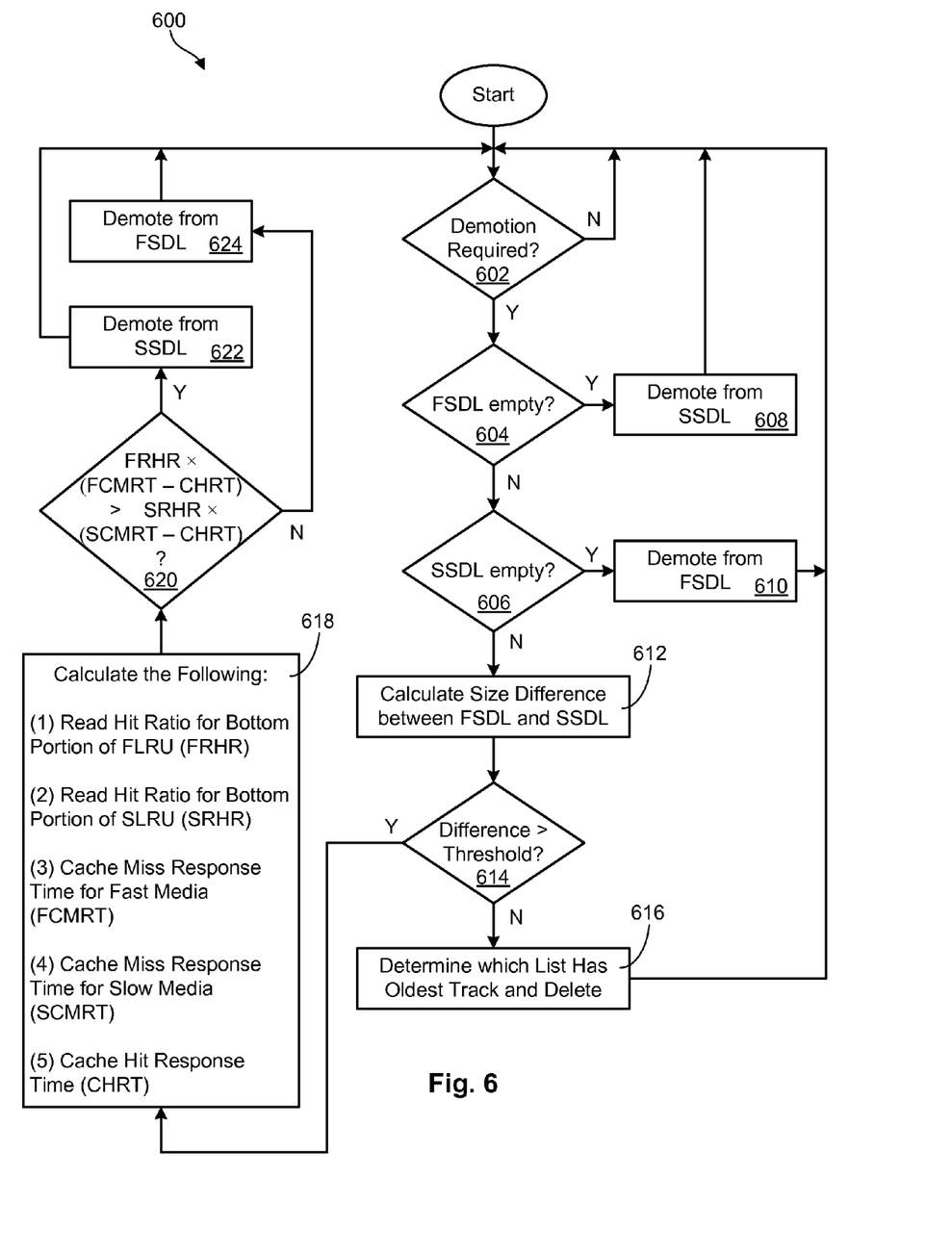
FIG. 6 is a flow diagram showing one embodiment of a method for allocating space in cache.

Referring to FIG. 6, in selected embodiments, a method 600 for allocating space in a cache 316 based on media I/O speed may include initially determining 602 whether demotion is required. This step may be as simple as determining 602 whether space is needed to store a new cache entry. If space is needed to store a new cache entry, the method 600 may determine 604, 606 whether either the FSDL 400a or the SSDL 400b is empty. If the FSDL 400a is empty, the method 600 demotes 608 a cache entry from the LRU end 402b of the SSDL 400b. If the SSDL 400b is empty, the method 600 demotes 610 a cache entry from the LRU end 402a of the FSDL 400a. If neither the FSDL 400a nor the SSDL 400b is empty, the method 600 may proceed by calculating 612 the size difference between the FSDL 400a and the SSDL 400b.

Figure 7:
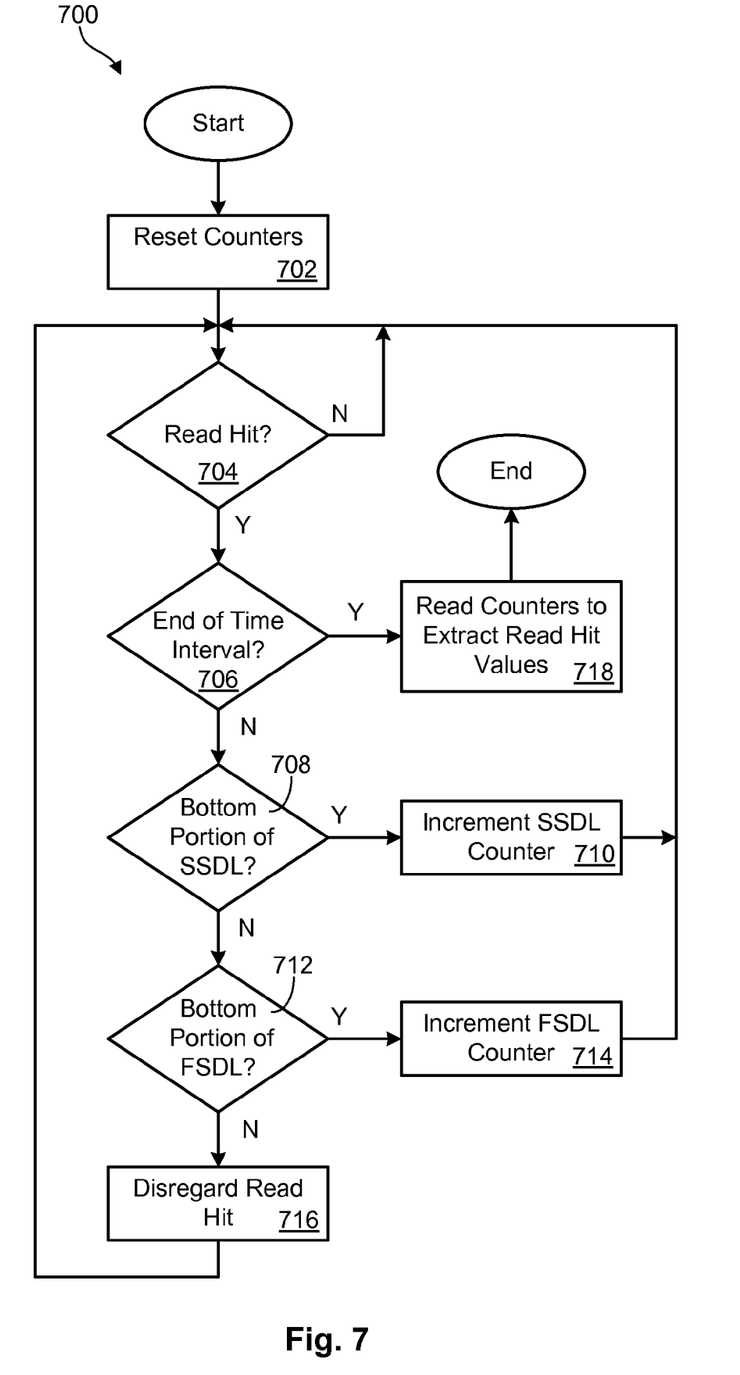
FIG. 7 is a flow diagram showing one embodiment of a method for calculating read-hit ratios for each list.

If the difference is greater than some specified threshold value (as determined in step 614), the method 600 may determine which list 400a, 400b has the oldest cache entry and delete that cache entry from the list. These steps 612, 614 essentially determine if the cache entries from one of the storage devices are dominating the space in the cache and, if this is not the case, find the list that has the oldest cache entry and delete that cache entry from the list. If, on the other hand, the difference is greater than the threshold value, meaning that the cache entries from one storage device are dominating the cache, the method 600 will try to correct this condition. To achieve this, the method 600 may calculate 618 the following values: (1) the read hit ratio for the bottom portion 404a of the FSDL 400a (FRHR); (2) the read hit ratio for the bottom portion 404b of the SSDL 400b (SRHR); (3) the cache-miss response time when reading from the faster-responding storage device (FCMRT); (4) the cache-miss response time when reading from the slower-responding storage device (SC-MRT); and (5) the cache-hit response time (CHRT). FIG. 7 shows one example of a method 700 for calculating the read hit ratios. The cache-miss response times and cache-hit response time may, in certain embodiments, be obtained using performance counters.

The method 600 may then compare 620 the expression FRHR×(FCMRT−CHRT) with the expression SRHR×(SC-MRT−CHRT) to determine which is greater. If the first expression is greater, the method 600 may demote 622 the oldest cache entry from the SSDL 400b. On the other hand, if the second expression is greater, the method 600 may demote 624 the oldest cache entry from the FSDL 400a. Essentially, these steps 620, 622, 624 demote the cache entries of faster-responding storage devices 316 faster than the cache entries of slower-responding storage devices, all other variables being equal, and demote cache entries having a lower read-hit ratio faster than cache entries having a higher read-hit ratio, all other variables being equal.

For example, if the same read-hit ratio is achieved for a slower-responding storage device and a faster-responding storage device, then the method 600 will demote cache entries from the FSDL 400a since the penalty is less for cache misses associated with the faster-responding device. This will allocate more space in the cache 316 to cache entries associated with the slower-responding device. On the other hand, if both storage devices respond with roughly the same I/O speed, then the method 600 will demote cache entries having a lower read-hit ratio faster than cache entries having a higher read-hit ratio. This will allocate more space in the cache 316 to entries having higher read-hit ratios.

The read-hit ratio is calculated for the bottom portion of the FSDL 400a and the SSDL 400b since the cache entries in these portions of the FSDL 400a and SSDL 400b will be demoted first. If the bottom portion has a high read-hit ratio, the method 600 is designed to retain, rather than demote, these cache entries. What constitutes the "bottom portion" is a design choice that may be adjusted. For example, the bottom portion could be the bottom 2, 10, 20, or even 50 percent of the lists 400a, 400b. The method 600, however, is not limited to calculating a read-hit ratio for the bottom portion. In other embodiments, the read-hit ratio may be calculated for the entire list 400a, 400b or some other portion of the list 400a, 400b.

As mentioned, FIG. 7 shows one non-limiting example of a method 700 for calculating the read-hit ratios for the bottom portions of the FSDL 400a and SSDL 400b. These read-hit ratios may be calculated over some desired time interval. In selected embodiments, the method 700 may include initially resetting 702 counters. A counter may be provided for each of the FSDL 400a and SSDL 400b. The method 700 may then monitor the cache for read hits. If a read hit is detected 704, the method 700 may determine 706 whether the end of the time interval has been reached. If not, the method 700 may determine 708 whether the read hit occurred to the bottom portion of the SSDL 400b. If so, the method 700 may increment 710 the counter associated with the SSDL 400b.

If, on the other hand, the method 700 determines that the read hit did not occur to the bottom portion of the SSDL 400b, the method 700 may determine 712 whether the read hit occurred to the bottom portion of the FSDL 400a. If so, the method 700 may increment 714 the counter associated with the FSDL 400a. If the method 700 determines that the read hit did not occur to the bottom portion of the SSDL 400b or the bottom portion of the FSDL 400a, the method 700 may disregard 716 the read hit. The method 700 may then continue to monitor 704 for the next read hit. When the end of the time interval is reached (at step 706), the method 700 may read the counters to extract the read hit values for the bottom portions of the FSDL 400a and SSDL 400b. These values may be used to provide the read-hit ratios calculated in step 618 of FIG. 6.

It should be noted that various other methods may be used to calculate the read-hit ratios and are thus encompassed within the scope of the present invention.

Figure 8:
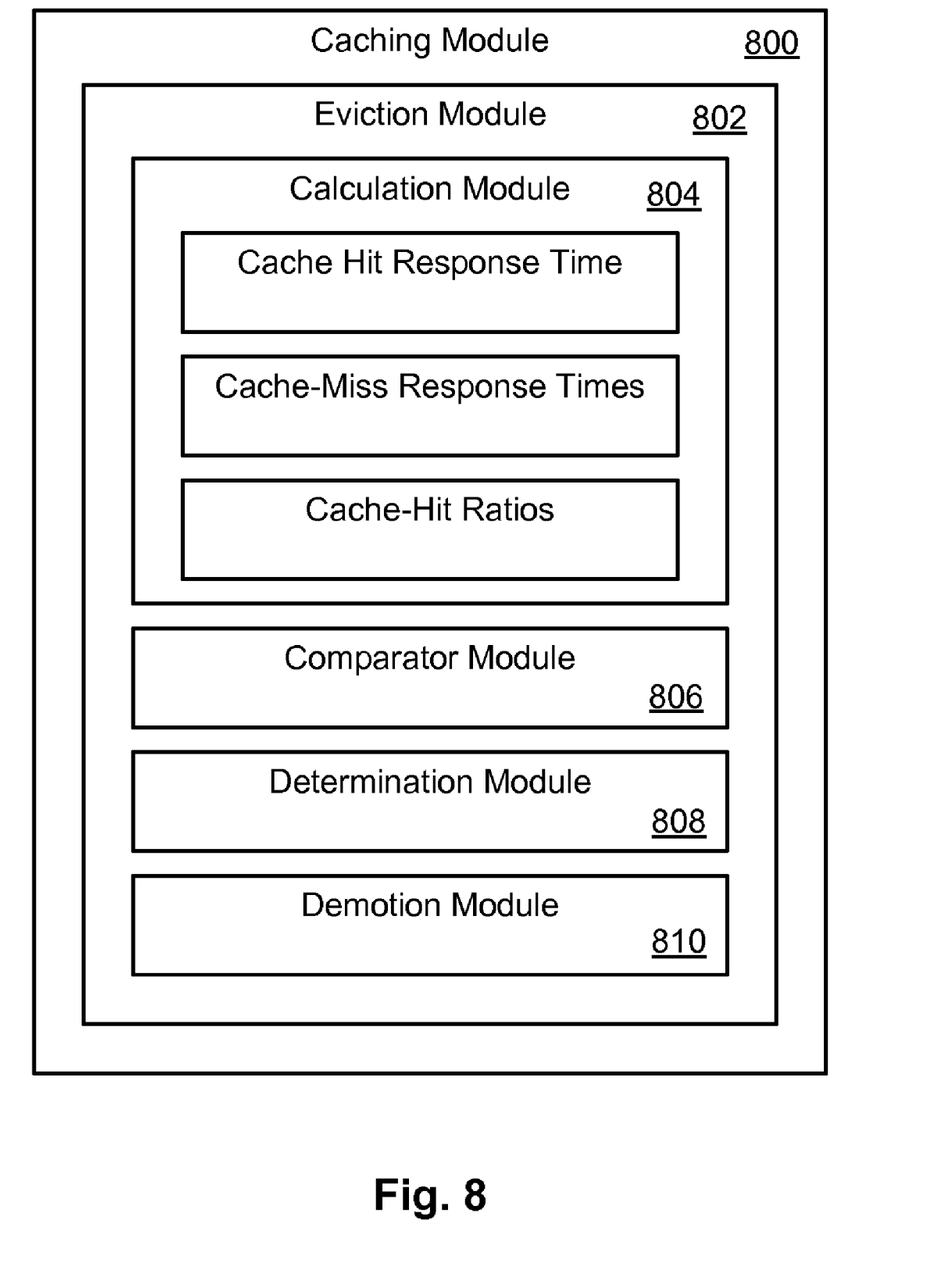
FIG. 8 is a high-level block diagram showing various modules that may be used to implement an apparatus and method in accordance with the invention.

Referring to FIG. 8, the functionality described by the methods 600, 700 of FIGS. 6 and 7 may be implemented in the form of one or more modules. These modules may be implemented in hardware, software or firmware executable on hardware, or a combination thereof. In selected embodiments, these modules may include a caching module 800 to store entries in a cache. These cache entries may, in certain embodiments, include cache entries associated with faster-responding storage devices and cache entries associated with slower-responding storage devices. This caching module 800 may include an eviction module 802. The eviction module 802 may implement an eviction policy designating how old cache entries are evicted from the cache to make space for new cache entries.

In selected embodiments, the eviction module 802 includes a calculation module 804, a comparator module 806, a determination module 808, and a demotion module 810. The calculation module 804 may calculate the cache-hit response time, the cache-miss response times for storage devices having data stored in the cache, and the read-hit ratios for selected data of each storage device that resides in the cache. These values may be used to create various expressions which may then be compared by a comparator module 806. Based on the result of this comparison, a determination module 808 may determine which cache entry to demote from the cache. The demotion module 810 may then demote this entry from the cache. In general, the modules 804, 806, 808, 810 will demote the cache entries of faster-responding storage devices 316 faster than the cache entries of slower-responding storage devices, all other variables being equal, and demote cache entries having a lower read-hit ratio faster than cache entries having a higher read-hit ratio, all other variables being equal.

The cache eviction policy described herein may be used in a wide variety of different computers, servers, storage systems, and network architectures. For example, referring again to FIGS. 1 through 3, the eviction policy may be used by a computer 102 or server 106 to more efficiently cache data from different storage devices, where some of the storage devices have different I/O speeds. These storage devices may be either internal or external storage devices, such as internal or external memories, hard-disk drives, solid-state drives, tape drives, or the like. The caching techniques may also be used by various interconnect devices 200, 202, such as routers, switches, directors, gateways, or other devices to cache data acquired from various heterogeneous sources. The caching techniques may also be used within storage systems 110, such as the IBM DS8000™ enterprise storage system or other analogous systems, to more efficiently cache data from storage devices with different I/O speeds. In other embodiments, Internet pages or other documents or files retrieved over a network or the Internet may be cached using the caching techniques described herein. These represent just a few examples of possible applications and do represent an exhaustive list. Indeed, any situation where a cache is used to store data originating from sources with different I/O speeds may take advantage of the caching techniques described herein.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for allocating space in cache based on media I/O speed, the method comprising:
storing, in a read cache, cache entries associated with faster-responding storage devices and cache entries associated with slower-responding storage devices; and
implementing an eviction policy in the read cache, wherein implementing the eviction policy comprises demoting, from the read cache, the cache entries of faster-responding storage devices faster than the cache entries of slower-responding storage devices, all other variables being equal.

2. The method of claim 1, wherein implementing the eviction policy further comprises demoting, from the read cache, cache entries having a lower read-hit ratio faster than cache entries having a higher read-hit ratio, all other variables being equal.

3. The method of claim 2, wherein implementing the eviction policy comprises the following:
calculating a cache-hit response time (CHRT) associated with the read cache;
calculating a cache-miss response time (FCMRT) associated with a faster-responding storage device;
calculating a cache-miss response time (SCMRT) associated with a slower-responding storage device;
calculating a read-hit ratio (FRHR) for cache entries in the read cache associated with the faster-responding storage device; and
calculating a read-hit ratio (SRHR) for cache entries in the read cache associated with the slower-responding storage device.

4. The method of claim 3, wherein implementing the eviction policy further comprises comparing the expression FRHR×(FCMRT−CHRT) with the expression SRHR×(SCMRT−CHRT).

5. The method of claim 4, wherein implementing the eviction policy further comprises demoting, from the read cache, a cache entry associated with one of the slower-responding storage device and the faster-responding storage device depending on which of the expressions is greater.

6. The method of claim 5, wherein demoting comprises demoting the least recently used cache entry associated with one of the faster-responding storage device and the slower-responding storage device.

7. The method of claim 3, further comprising calculating the fast read-hit ratio and the slow read-hit ratio by calculating the number of read hits over a time interval.

8. The method of claim 3, further comprising storing the cache entries associated with the faster-responding storage device in a first list in the read cache, and storing the cache entries associated with the slower-responding storage device in a second list in the read cache.

9. A computer program product to allocate space in cache based on media I/O speed, the computer program product comprising a computer-usable medium having computer-usable program code embodied therein, the computer-usable program code comprising:
computer-usable program code to store, in a read cache, cache entries associated with faster-responding storage devices and cache entries associated with slower-responding storage devices; and
computer-usable program code to implement an eviction policy in the read cache, wherein implementing the eviction policy comprises demoting, from the read cache, the cache entries of faster-responding storage devices faster than the cache entries of slower-responding storage devices, all other variables being equal.

10. The computer program product of claim 9, wherein implementing the eviction policy further comprises demoting, from the read cache, cache entries having a lower read-hit ratio faster than cache entries having a higher read-hit ratio, all other variables being equal.

11. The computer program product of claim 10, wherein implementing the eviction policy further comprises the following:
calculating a cache-hit response time (CHRT) associated with the read cache;
calculating a fast cache-miss response time (FCMRT) associated with a faster-responding storage device;
calculating a slow cache-miss response time (SCMRT) associated with a slower-responding storage device;
calculating a fast read-hit ratio (FRHR) for cache entries in the read cache associated with the faster-responding storage device;
calculating a slow read-hit ratio (SRHR) for cache entries in the read cache associated with the slower-responding storage device.

12. The computer program product of claim 11, wherein implementing the eviction policy further comprises comparing the expression FRHR×(FCMRT−CHRT) with the expression SRHR×(SCMRT−CHRT).

13. The computer program product of claim 12, wherein implementing the eviction policy further comprises demoting, from the read cache, a cache entry associated with one of the slower-responding storage device and the faster-responding storage device depending on which of the expressions is greater.

14. The computer program product of claim 13, wherein demoting comprises demoting the least recently used cache entry associated with one of the faster-responding storage device and the slower-responding storage device.

15. The computer program product of claim 11, further comprising computer-usable program code to calculate the fast read-hit ratio and the slow read-hit ratio by calculating the number of read hits over a time interval.

16. The computer program product of claim 11, further comprising computer-usable program code to store the cache entries associated with the faster-responding storage device in a first list in the read cache, and store the cache entries associated with the slower-responding storage device in a second list in the read cache.

17. An apparatus for allocating space in cache based on media I/O speed, the apparatus comprising:
a caching module to store, in a read cache, cache entries associated with faster-responding storage devices and cache entries associated with slower-responding storage devices; and
an eviction module to implement an eviction policy in the read cache, wherein implementing the eviction policy comprises demoting, from the read cache, the cache entries of faster-responding storage devices faster than the cache entries of slower-responding storage devices, all other variables being equal.

18. The apparatus of claim 17, the eviction module further configured to demote, from the read cache, cache entries having a lower read-hit ratio faster than cache entries having a higher read-hit ratio, all other variables being equal.

19. The apparatus of claim 18, further comprising a calculation module to calculate the following:
a cache-hit response time (CHRT) associated with the read cache;
a fast cache-miss response time (FCMRT) associated with a faster-responding storage device;
a slow cache-miss response time (SCMRT) associated with a slower-responding storage device;
a fast read-hit ratio (FRHR) for cache entries in the read cache associated with the faster-responding storage device;
a slow read-hit ratio (SRHR) for cache entries in the read cache associated with the slower-responding storage device.

20. The apparatus of claim 19, further comprising a comparator module to compare the expression FRHR×(FCMRT−CHRT) with the expression SRHR×(SCMRT−CHRT).

21. The apparatus of claim 20, further comprising a determination module to determine which of the expressions is greater, and a demotion module to demote a cache entry associated with one of the slower-responding storage device and the faster-responding storage device depending on which of the expressions is greater.

22. The apparatus of claim 21, wherein the demotion module is further configured to demote the least recently used cache entry associated with one of the faster-responding storage device and the slower-responding storage device.

23. The apparatus of claim 19, wherein the calculation module is further configured to calculate the fast read-hit ratio and the slow read-hit ratio by calculating the number of read hits over a time interval.

24. The apparatus of claim 17, wherein the caching module is configured to store the cache entries associated with the faster-responding storage device in a first list in the read cache, and store the cache entries associated with the slower-responding storage device in a second list in the read cache.

* * * * *